US011907751B2

(12) United States Patent
Galles

(10) Patent No.: US 11,907,751 B2
(45) Date of Patent: *Feb. 20, 2024

(54) RESOURCE FAIRNESS ENFORCEMENT IN SHARED IO INTERFACES

(71) Applicant: Pensando Systems Inc., Milpitas, CA (US)

(72) Inventor: Michael Brian Galles, Los Altos, CA (US)

(73) Assignee: Pensando Systems, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,705

(22) Filed: Dec. 19, 2022

(65) Prior Publication Data

US 2023/0121317 A1 Apr. 20, 2023

Related U.S. Application Data

(63) Continuation of application No. 16/691,026, filed on Nov. 21, 2019, now Pat. No. 11,593,136.

(51) Int. Cl.
| | | |
|---|---|---|
| *G06F 9/455* | (2018.01) | |
| *H04L 47/50* | (2022.01) | |
| *H04L 47/70* | (2022.01) | |
| *H04L 49/00* | (2022.01) | |
| *H04L 43/0876* | (2022.01) | |
| *G06F 13/30* | (2006.01) | |
| *H04L 49/253* | (2022.01) | |

(52) U.S. Cl.
CPC .......... *G06F 9/45558* (2013.01); *G06F 13/30* (2013.01); *H04L 43/0876* (2013.01); *H04L 47/50* (2013.01); *H04L 47/70* (2013.01); *H04L 49/254* (2013.01); *H04L 49/3009* (2013.01); *G06F 2009/45579* (2013.01); *G06F 2009/45595* (2013.01)

(58) Field of Classification Search
CPC ................. G06F 9/45558; G06F 13/30; G06F 2009/45579; G06F 2009/45595; H04L 43/0876; H04L 47/50; H04L 47/70; H04L 49/254; H04L 49/3009; H04L 41/0893; H04L 41/40; H04L 43/16; H04L 43/20
See application file for complete search history.

(56) References Cited

U.S. PATENT DOCUMENTS

| 6,665,725 | B1 | 12/2003 | Dietz et al. |
| 9,058,198 | B2 | 6/2015 | McGrath et al. |

(Continued)

OTHER PUBLICATIONS

International Search Report and Written Opinion from PCT/US2020/061496 dated Feb. 8, 2021.

*Primary Examiner* — Habte Mered
(74) *Attorney, Agent, or Firm* — Patterson + Sheridan, LLP

(57) ABSTRACT

Described are platforms, systems, and methods for resource fairness enforcement. In one aspect, a programmable input output (IO) device comprises a memory unit, the memory unit having instructions stored thereon which, when executed by the programmable IO device, cause the programmable IO device to perform operations comprising: receiving an input from a logical interface (LIF); determining, by at least one meter, a metric regarding at least one resource used during a processing of the input through a programmable pipeline; and regulating additional input received from the LIF based on the metric and a threshold for the at least one resource.

20 Claims, 9 Drawing Sheets

(56) References Cited

U.S. PATENT DOCUMENTS

| | | | |
|---|---|---|---|
| 9,300,719 | B2 | 3/2016 | Luna et al. |
| 9,332,551 | B2 | 5/2016 | Wells |
| 9,674,104 | B1 | 6/2017 | Pan et al. |
| 9,686,141 | B2 | 6/2017 | Soni et al. |
| 9,712,439 | B2 | 7/2017 | Bosshart et al. |
| 10,254,968 | B1 | 4/2019 | Gazit et al. |
| 10,397,324 | B2 | 8/2019 | Hrischuk et al. |
| 10,721,167 | B1 | 7/2020 | Bosshart et al. |
| 10,761,893 | B1 | 9/2020 | Bhadauria et al. |
| 10,977,083 | B2 | 4/2021 | Hari |
| 2005/0155021 | A1 | 7/2005 | DeWitt et al. |
| 2010/0254387 | A1 | 10/2010 | Trinh et al. |
| 2011/0199117 | A1 | 8/2011 | Hutchings et al. |
| 2012/0216080 | A1 | 8/2012 | Bansal et al. |
| 2014/0376555 | A1 | 12/2014 | Choi et al. |
| 2016/0094401 | A1 | 3/2016 | Anwar et al. |
| 2016/0154660 | A1 | 6/2016 | Clark et al. |
| 2017/0085501 | A1 | 3/2017 | Utgikar et al. |
| 2017/0093986 | A1 | 3/2017 | Kim et al. |
| 2017/0250869 | A1 | 8/2017 | Voellmy |
| 2019/0188065 | A1 | 6/2019 | Anghel et al. |
| 2020/0042920 | A1 | 2/2020 | Moorthy et al. |
| 2020/0356408 | A1 | 11/2020 | Gentry et al. |
| 2021/0263779 | A1 | 8/2021 | Haghighat et al. |

RESOURCE FAIRNESS ENFORCEMENT IN SHARED IO INTERFACES

RELATED APPLICATIONS

This application is a continuation of U.S. patent application Ser. No. 16/691,026, filed Nov. 21, 2019, the contents of which are incorporated herein by reference in its entirety.

BACKGROUND

In shared computing resource environments, including cloud deployments, a noisy neighbor problem occurs when one client in the shared infrastructure consumes a large amount of bandwidth, denying neighboring clients of their fair share. This noisy neighbor problem can become amplified when one client requires resource intensive features while neighbor clients use relatively few resources. For example, if one client is configured for stateful firewalls with Distributed Denial of Service (DDOS) prevention services while another client is part of a local network which requires no additional services, traffic to and from the resource heavy client can slow traffic to and from its neighbor clients. If the resource heavy client is also receiving or sending a storm of small packets, the effect is further amplified. To ensure fairness between clients in these scenarios, network and other Input/Output (IO) device infrastructure can measure and meter access to shared resources. Metering can be evenly distributed or based on priority weights, metered resources can include table access, computation, packet buffering, or other shared structures in the IO device.

SUMMARY

One embodiment described herein is an input output (IO) device that includes a memory unit having instructions stored thereon which, when executed by the IO device, cause the IO device to perform operations that include receiving input from a first logical interface (LIF) and a second LIF, tracking a first metric regarding a usage per packet of at least one resource of the one or more resources when processing input from the first LIF and tracking a second metric regarding a usage per packet of the at least one resource when processing input from the second LIF, and regulating additional input received from the first and second LIFs by comparing the first metric to a first threshold assigned to the first LIF for the at least one resource and by comparing the second metric to a second threshold assigned to the second LIF for the at least one resource, where the first and second thresholds are different.

Another embodiment herein is one or more non-transitory computer-readable storage media coupled to an IO device and having instructions stored thereon which, when executed by the IO device, cause the IO device to perform operations. The operations include receiving input from a first LIF and a second LIF, tracking a first metric regarding a usage per packet of at least one resource of the one or more resources when processing input from the first LIF and tracking a second metric regarding a usage per packet of the at least one resource when processing input from the second LIF, and regulating additional input received from the first and second LIFs by comparing the first metric to a first threshold assigned to the first LIF for the at least one resource and by comparing the second metric to a second threshold assigned to the second LIF for the at least one resource, where the first and second thresholds are different.

Another embodiment herein is an IO device that includes a plurality of pipelined stages and a plurality of meters each of which is assigned to a determine whether received packets are permitted to enter a respective stage of the plurality of pipelined stages. Further, each of the plurality of meters is configured to track a first metric regarding a usage of a hardware resource in the respective stage when processing packets received from a first LIF, track a second metric regarding a usage of a hardware resource in the respective stage when processing packets received from a second LIF, block the packets received from the first LIF from being processed by the respective stage when the first metric satisfies a first threshold, and block the packets received from the second LIF from being processed by the respective stage when the second metric satisfies a second threshold, where the first and second thresholds are different.

It shall be understood that different aspects of the described system can be appreciated individually, collectively, or in combination with each other. Various aspects of the systems described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
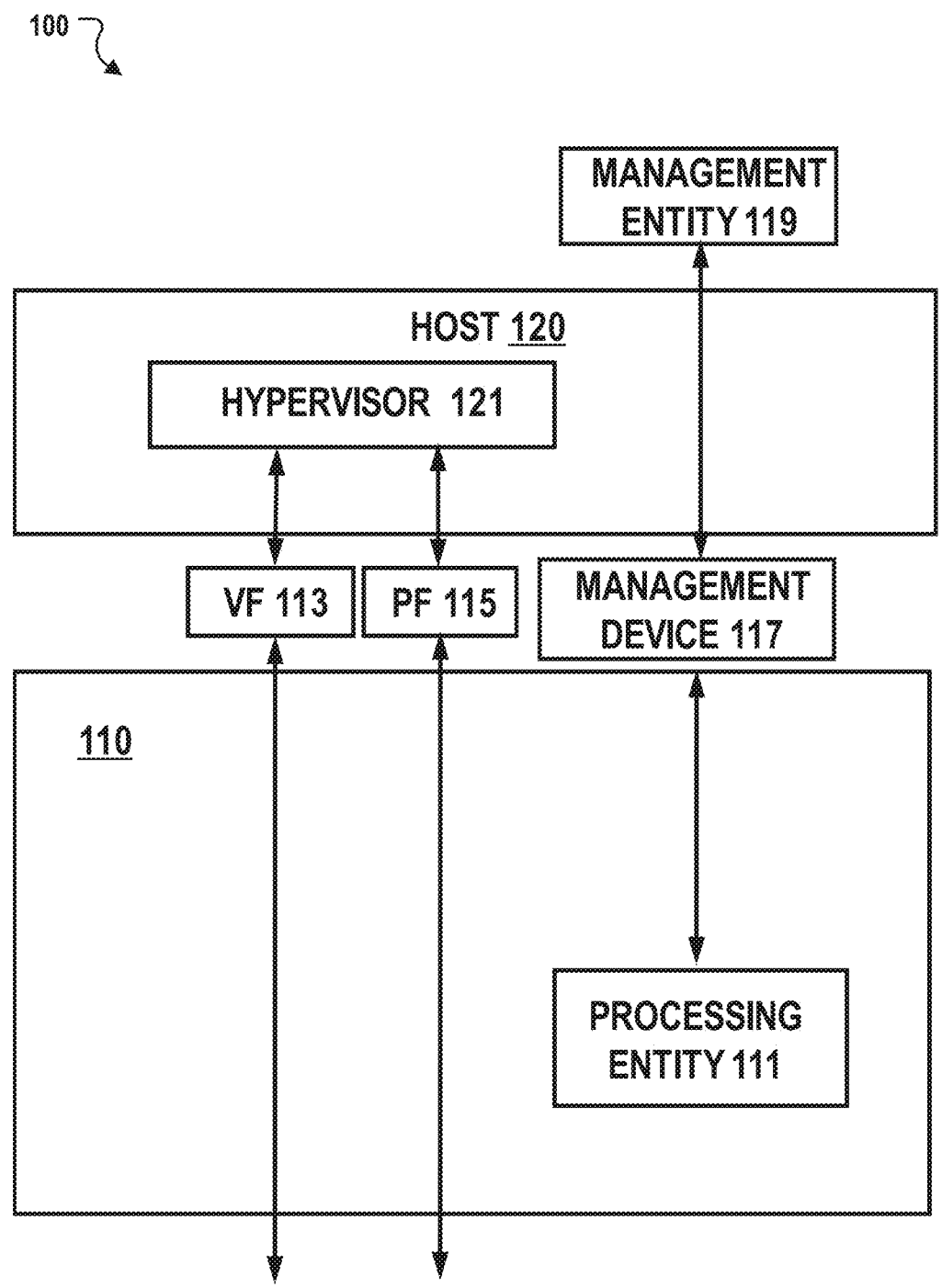
FIG. 1 depicts a non-limiting example a computing system architecture that may be employed by embodiments of the present disclosure.

Described herein, in certain embodiments, are programmable IO devices comprising: a memory unit, the memory unit having instructions stored thereon which, when executed by the programmable IO device, cause the programmable IO device to perform operations. The operations comprise: receiving an input from a LIF; determining, by at least one meter, a metric regarding at least one resource used during a processing of the input through a programmable pipeline; and regulating additional input received from the LIF based on the metric and a threshold for the at least one resource.

Also described herein, in certain embodiments, are methods for enforcing resource fairness executed by a programmable IO comprising: receiving an input from a LIF; determining, by at least one meter, a metric regarding at least one resource used during a processing of the input through a programmable pipeline; and regulating additional input received from the LIF based on the metric and a threshold for the at least one resource.

Also described herein, in certain embodiments, are resource fairness enforcement systems each comprising an LIF and a programmable IO device configured to execute instructions that cause the programmable IO device to perform operations comprising: receiving an input from a LIF; determining, by at least one meter, a metric regarding at least one resource used during a processing of the input through a programmable pipeline; and regulating additional input received from the LIF based on the metric and a threshold for the at least one resource.

Also described herein, in certain embodiments, are non-transitory computer-readable storage media coupled to a programmable input output (TO) device; the one or more non-transitory computer-readable storage media having instructions stored thereon which, when executed by the programmable IO device, cause the IO device to perform operations comprising: receiving an input from a LIF; determining, by at least one meter, a metric regarding at least one resource used during a processing of the input through a programmable pipeline; and regulating additional input received from the LIF based on the metric and a threshold for the at least one resource.

Certain Definitions

Unless otherwise defined, all technical terms used herein have the same meaning as commonly understood by one of ordinary skill in the art to which this described system belongs.

As used herein, the singular forms "a," "an," and "the" include plural references unless the context clearly dictates otherwise. Any reference to "or" herein is intended to encompass "and/or" unless otherwise stated.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As referenced herein, terms "component," "system," "interface," "unit," "block," "device" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, PCIe includes a high-speed serial computer expansion bus standard. In some examples, PCIe is a motherboard interface for hardware components, such as, graphics cards, hard drives, solid-state drives (SSDs), Wi-Fi and Ethernet hardware connections. PCIe is based on point-to-point topology, with separate serial links connecting every device to the root complex (host). PCIe has improvements over the older standards (e.g., Peripheral Component Interconnect (PCI), PCI eXtended (PCI-X) and Accelerated Graphics Port (AGP) bus standards), including higher maximum system bus throughput, lower IO pin count and smaller physical footprint, better performance scaling for bus devices, a more detailed error detection and reporting mechanism (e.g., Advanced Error Reporting, (AER)), and native hot-swap functionality. More recent revisions of the PCIe standard provide hardware support for IO virtualization.

As used herein, an expansion card includes a printed circuit board that can be inserted into an electrical connector, or expansion slot, on a computer motherboard, backplane or riser card to add functionality to a computer system via an expansion bus. In some embodiments, an expansion bus is a computer bus that moves information between the internal hardware of a computer system, such as the CPU and random access memory (RAM), and peripheral devices such as cache, other memory, data storage or electronic display adapters.

As used herein, operations include compression, decompression, encryption, decryption, hash digest computation (dedupe), checksum, and so forth. In some embodiments, these operations also perform "generic" work, such as fetch, decode and execute.

As used herein, a chain of operations includes a combination or a sequence of operations, for example, compress plus encrypt, decrypt plus decompress, checksum plus encrypt plus checksum, and hash plus compress plus pad plus hash.

As used herein, a datapath includes a collection of functional units, such as arithmetic logic units or multipliers, which perform data processing operations, registers, and buses. A larger datapath can be made by joining more than one number of datapaths using multiplexer. In some embodiments, offload chaining within a datapath provides for increased processing throughput. For example, a smartNIC may have a 100 Gigabits per second (Gbps) PCIe data path which, if not properly employed by, for example, a host operating system, would not achieve the full 100 Gbps throughput. The counterpart of a datapath is the control path, which may execute on a host CPU and, as such, would not be able to reach the 100 Gbps throughput.

Embodiments of the described system may be used in a variety of applications. Some embodiments of the described system may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

The term "table" refers to a variety types of tables involved in data or packet processing. For example, the table may be match tables used in the match+action stages, such as forwarding tables (e.g., hash tables for Ethernet address lookup, the longest-prefix match tables for IPv4 or IPv6, wildcard lookups for Access Control Lists (ACLs)). These tables may be stored in various memory locations such as in internal static random access memory (SRAM), NIC DRAM, or host memory.

The term "match+action" refers to the paradigm for network packet switching (such as those performed by an OpenFlow switch or P4 pipeline, which uses match tables, action tables, statistics memories, meters memories, stateful memories, and ternary indirection memories). The term "P4" refers to a high-level language for programming protocol-independent packet processors. P4 is a declarative language for expressing how packets are processed by the pipeline of a network forwarding element such as a switch, NIC, router or network function appliance. It is based upon an abstract forwarding model consisting of a parser and a set of match+action table resources, divided between ingress and egress. The parser identifies the headers present in each incoming packet. Each match+action table performs a lookup on a subset of header fields and applies the actions corresponding to the first match within each table.

While portions of this disclosure, for demonstrative purposes, refer to wired and/or wired communication systems or methods, embodiments of the described system are not limited in this regard. As an example, one or more wired communication systems, can utilize one or more wireless communication components, one or more wireless communication methods or protocols, or the like.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or NIC with OS bypass capabilities, or to a to a fast or high-speed interconnect infrastructure or fabric, embodiments of the described system are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the described system may be utilized in conjunction with Infini-Band (IB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs; with infrastructures, fabrics, components, adapters, host channel adapters, cards or NICs that are connectionless and/or stateless; and/or other suitable hardware.

Computer systems employ a wide variety of peripheral components or IO devices. An example of a host processor of a computer system connected to IO devices through a component bus defined by PCIe, a high-speed serial computer expansion bus standard. Device drivers (also referred to drivers) are hardware-specific software which controls the operation of hardware devices connected to computing systems.

In computing, virtualization techniques are used to allow multiple operating systems to simultaneously share processor resources. One such virtualization technique is Single Root IO Virtualization (SR-IOV), which is described in the PCI-SIG Single Root IO Virtualization and Sharing Specifications. A physical IO device may allow multiple virtual machines to use the device concurrently through SR-IOV. In SR-IOV, a physical device may have physical functions (PFs) that allow for input/output operations and device configuration, as well as one or more virtual functions (VFs)

that allow for data input/output. According to SR-IOV, a PCIe device can appear to be multiple separate physical PCIe devices. For example, a SR-IOV NIC having a single port can have up to 256 virtual functions, with each virtual function representing a respective NIC port.

In one aspect, a programmable device interface is provided. The device interface may be a highly optimized ring based IO queue interface with an efficient software programming model to deliver high performance with CPU and PCIe bus efficiency. FIG. 1 shows a block diagram of an exemplary computing system architecture 100, in accordance with embodiments of the described system. A hypervisor 121 on the host computing system 120 may interact with the physical IO device 110 using the PFs 115 and one or more VFs 113. As illustrated, the computing system 120 may comprise a management device 117 configured for management of the interface devices. The management device 117 may be in communication with a processing entity 111 (e.g., ARM cores) and a management entity 119 (e.g., management virtual machine system). It should be noted that the illustrated computing system is only an example mechanism, without suggesting any limitation as to the scope of the described system. The provided programmable IO interface and methods can be applied to any operating-system-level virtualization (e.g., container and docker system) or machine level virtualization or computing system without virtualization features.

The hypervisor 121 generally provides operating system functionality (e.g., process creation and control, file system process threads, etc.) as well as CPU scheduling and memory management for the host. In some cases, the host computing system 120 may include programs that implement a machine emulator and virtualizer. The machine emulator and virtualizer may assist in virtualizing respective computer IO devices in virtual machines, such as virtualized hard disks, compact disk drives, and NICs. Virtio is a virtualization standard for implementing virtual IO devices in a virtual machine and may be considered as an abstraction for a set of common emulated devices in a hypervisor.

The provided programmable IO device interface mechanism allows for native hardware speeds when using the device emulator. The programmable IO device interface allows the host system to interface with the IO device with existing device drivers without reconfiguration or modification. In some cases, the VF device, PF device and management device may have similar driver interface such that such devices can be supported by a single driver. Such devices may, in some cases, be referred to as Ethernet devices.

The IO device 110 may provide a variety of services and/or functionality to an operating system operating as a host on computing system 120. For example, the IO device may provide network connectivity functions to the computing system, coprocessor functionality (e.g., graphics processing, encryption/decryption, database processing, etc.) and the like. The IO device 110 may interface with other components in the computing system 100 via, for example, a PCIe bus.

As mentioned above, SR-IOV specification enables a single root function (for example, a single Ethernet port) to appear to virtual machines as multiple physical devices. A physical IO device with SR-IOV capabilities may be configured to appear in the PCI configuration space as multiple functions. The SR-IOV specification supports physical functions and virtual functions.

Physical functions are full PCIe devices that may be discovered, managed, and configured as normal PCI devices. Physical functions configured and manage the SR-IOV functionality by assigning virtual functions. The IO device may expose one or more PFs 115 to a host computing system 120 or hypervisor 121. The PFs 115 may be full-featured PCIe devices that include all configuration resources and capabilities for the IO device. In some cases, the PFs may be PCIe functions that include SR-IOV extended capability, which facilitates the configuration or management of the IO device. The PF device is essentially a base controller of the Ethernet device. The PF device may be configured with up to 256 VFs. In some cases, the PFs may include extended operations such as allocating, configuring and freeing a VF, discovering hardware capabilities of the VF, such as Receive Side Scaling (RSS), discovering hardware resources of the VF, such as number of queues and interrupts resources, configuring the hardware resources and features of a VF, saving and restoring hardware state and the like. In some instances, the PF device may be configured as a boot device which may present an Option ROM base address registers (BARs).

The IO device may also provide one or more VFs 113. The VFs may be lightweight PCIe functions that contain the resources necessary for data movement but may have a minimized set of configuration resources. In some cases, the VFs may include lightweight PCIe functions that support SR-IOV. To use SR-IOV devices in a virtualized system, the hardware may be configured to create multiple VFs. These VFs may be made available to the hypervisor for allocations to virtual machines. The VFs may be manipulated (e.g., created, configured, monitored, or destroyed) for example, by the SR-IOV physical function device. In some cases, each of the multiple VFs is configured with one or more BARs to map NIC resources to the host system. A VF may map one or more LIFs or port, which are used in the IO device for forwarding and transaction identification. A LIF may belong to only one VF. Within a physical device, all virtual functions may have an identical BAR resource layout, stacked sequentially in host PCIe address space. The IO device PCIe interface logic may be programmed to map control registers and NIC memory regions with programmable access permissions (e.g., read, write, execute) to the VF BARs.

The IO device 110 may comprise a management device 117 for management of the IO device. The management device 117 may not have direct access to the network uplink ports. The management device may be in communication with the processing entity 111. For example, the traffic on the management device may be steered to internal receive queues for processing by the management software on the processing entity 111. In some cases, the management device may be made available to pass through the hypervisor to a management entity 119 such as a management virtual machine. For example, the management device 117 may be assigned a device ID different from the PF device 115, such that a device driver in the hypervisor may be released for the PF device when the PF device does not claim the management device.

Figure 2:
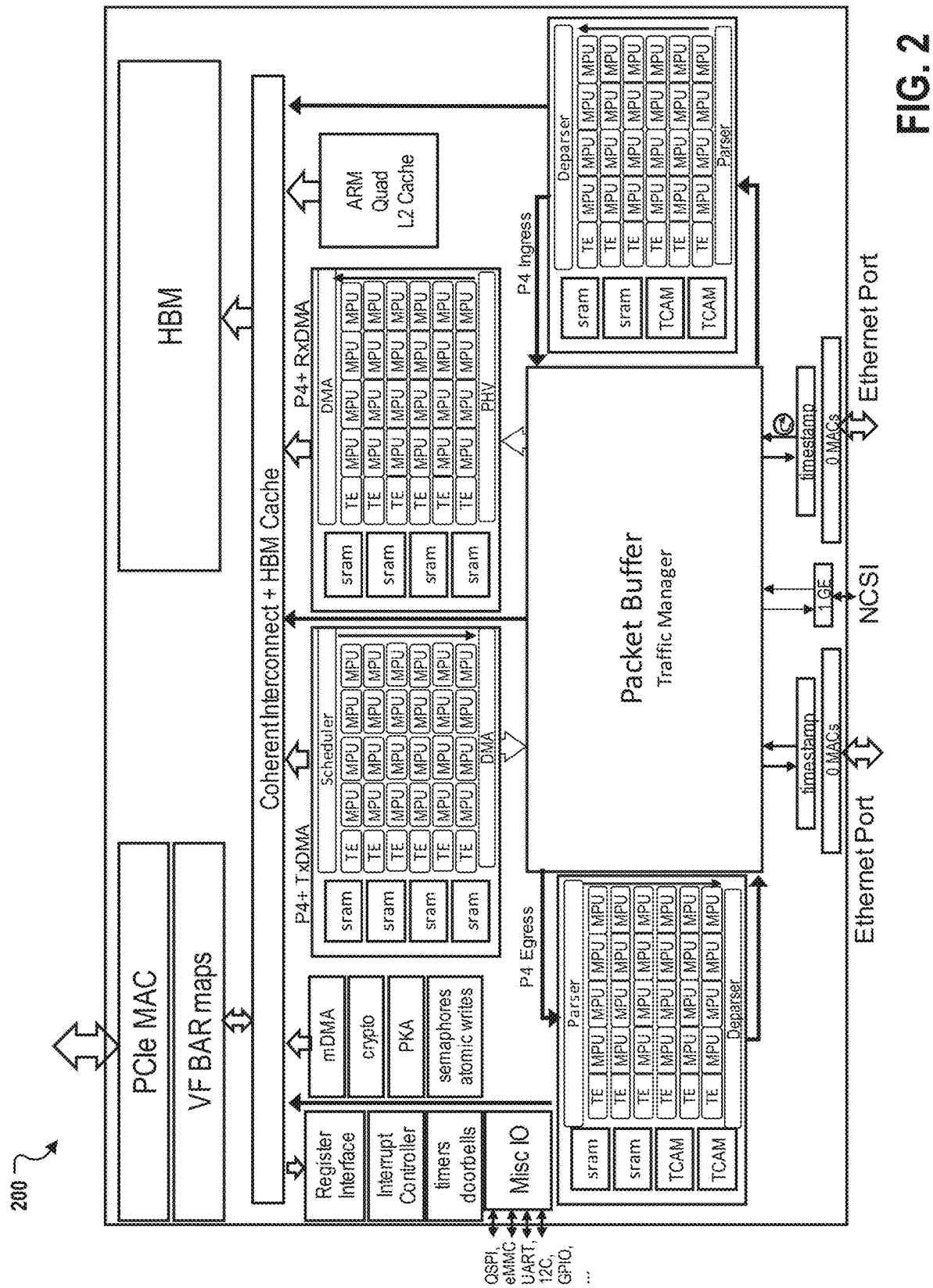
FIG. 2 depicts a non-limiting example of configurations of multiples MPUs for executing a program that may be employed by embodiments of the present disclosure.

FIG. 2 shows another exemplary IO device system 200 with described programmable device interface, in accordance with some embodiments of the described system. The system 200 serves as an example of implementing the P4 and extended P4 pipelines and various other functions to provide an improved network performance. In some cases, the device interface may have improved network performance by: not requiring PCIe bus register reads in the packet transmit or receive path; providing a single posted (non-blocking) PCIe bus register write for packet transmit; supporting for message signaled interrupts (MSI) and message signaled interrupts-extended (MSI-X) modes with driver-configurable interrupt moderation for high-performance interrupt processing; supporting IO queues with outstanding requests (e.g., up to 64 k) per queue; transmitting Transmission Control Protocol (TCP) segmentation Offload (TSO) with improved send size; providing TCP/User Datagram Protocol (UDP) checksum offload; supporting for a variable number of Receive Queues to support industry standard RSS; supporting SR-IOV with up to 255 virtual functions.

The IO device system 200 may be the same IO device as described in FIG. 1 and implemented as a rack mounted device and comprise one or more ASICs and/or boards with components mounted thereon. As shown in FIG. 2, the system 200 may comprise four advanced RISC machine (ARM) processors with coherent L1 and L2 caches, a shared local memory system, flash non-volatile memory, DMA engines, and miscellaneous IO devices for operation and debug. The ARM processors may observe and control all NIC resources via an address map. The ARM processor may implement the P4 pipeline and the extended P4 pipeline as described later herein.

The system may comprise a host interface and a network interface. The host interface may be configured to provide communication link(s) with one or more hosts (e.g., host servers). The host interface block may also observe regions of the address space via PCIe BAR maps to expose NIC functions to a host system. In an example, the address map may be initially created according to the principles of ARM memory maps, ARM limited, which provides SOC addressing guidelines for a 34-bit memory map.

The network interface may support network connections or uplinks with a computing network that may be, for example, a local area network, wide area network and various others as described elsewhere herein. The physical link may be controlled by a management agent (e.g., management entity 119) through the device driver. For example, the physical link may be configured via a "virtual link" associated with a device LIF.

Memory transactions in the system 200, including host memory, high bandwidth memory (HBM), and registers may be connected via a coherent network on a chip (NOC) based on IP from an external Systems. The NOC may provide cache coherent interconnect between the NOC masters, including P4 pipeline, extended P4 pipeline, DMA, PCIe, and ARM. The interconnect may distribute host memory transactions across a plurality (e.g., 16) of HBM interfaces using a programmable hash algorithm. All traffic targeting HBM may be stored in the NOC cache (e.g., 1 MB cache). The NOC cache may be kept coherent with the ARM caches. The NOC cache may be used to aggregate HBM write transactions which may be smaller than the cache line (e.g., size of 64 bytes), as the HBM is not efficient when processing small writes. The NOC cache may have high bandwidth, supporting up to 3.2 Tb/s operation as it fronts the 1.6 Tb/s HBM.

The system may comprise an internal HBM memory system for running Linux, storing large data structures such as flow tables and other analytics, and providing buffering resources for advanced features including TCP termination and proxy, deep packet inspection, storage offloads, and connected FPGA functions. The memory system may comprise an HBM module which may support 4 GB capacity or 8 GB capacity, depending on package and HBM.

As mentioned above, the system may comprise a PCIe host interface. The PCIe host interface may support a bandwidth of, for example, 100 Gb/s per PCIe connection (e.g., dual PCIe Gen4×8 or single PCIe Gen3×16). A mechanism or a scheme to map resources available at the IO device to memory-mapped control regions associated with the virtual IO devices may be implemented by using a pool of configurable PCIe BARs coupled with a resource mapping table to store mapping information for each virtual IO device. The IO resources provided by the IO device may be mapped to host addresses in the framework of the PCIe standard such that the same device drivers that are utilized to communicate with physical PCIe devices may be utilized to communicate with corresponding virtual PCIe devices.

The IO device interface may comprise programmable registers. These registers may comprise, for example, PCIe BARs that may include a first memory BAR containing device resources (e.g., device command registers, doorbell registers, interrupt control registers, interrupt status registers, MSI-X interrupt table, MSI-X interrupt pending bit array, etc.) a second BAR containing device doorbells pages, and a third BAR for mapping a controller memory buffer.

The device command registers are a set of registers used for submitting administrative commands to the hardware or firmware. For example, the device command registers may specify a single-64 byte command and a single 16-byte completion response. This register interface may allow for a single command outstanding at a time. The device command doorbell is a special purpose doorbell used to signal a command is ready in the device command registers.

The second BAR may contain doorbells pages. The general form of the second BAR may contain multiple LIFs with multiple doorbell pages per LIF. A network device (i.e., IO device) may have at least one LIF with at least one doorbell page. Any combination of single/many LIFs with single/many Doorbell Pages is possible and the driver may be prepared to identify and operate the different combinations. In an example, doorbell pages may be presented on a 4 k stride by default to match a common system page size. The stride between doorbell pages may be adjusted in the virtual function device 113 to match the system page size configuration setting in the SR-IOV capability header in the parent physical function device 115. This page size separation allows protected independent direct access to a set of doorbell registers by processes by allowing each process to map and access a doorbell page dedicated for its use. Each page may provide the doorbell resources needed to operate the data path queue resources for a LIF, while protecting access to those resources from another process.

The doorbell register may be written by software to adjust a queue's producer index. Adjusting the producer index is the mechanism to transfer ownership of queue entries in the queue descriptor ring to the hardware. Some doorbell types, such as the Admin Queue, Ethernet Transmit Queue, and RDMA Send Queue, may cause the hardware queue to schedule further processing of the descriptors available in the queue. Other queue types, such as Completion Queues and Receive Queues, may require no further action from the hardware queue after updating the producer index.

The interrupt status register may contain a bit for each interrupt resource of the device. The register may have a bit set indicating the corresponding interrupt resource has asserted its interrupt. For example, bit 0 in Interrupt Status indicates interrupt resource 0 is asserted, bit 1 indicates interrupt resource 1 is asserted.

The controller memory buffer may be a region of general-purpose memory resident on the IO device. The user or kernel driver may map in this controller memory BAR, and build descriptor rings, descriptors, and/or payload data in the region. A bit may be added in the descriptor to select whether the descriptor address field is interpreted as a host memory address, or as an offset relative to the beginning of the device controller memory window. The extended P4 program may set a designated bit (e.g., bit 63) of the address if it is a host address or clear the bit and add the device controller memory base address to the offset when building the TxDMA operations for the DMA stage.

The MSI-X resources may be mapped through the first BAR and the format may be described by the PCIe Base Specification. The MSI-X interrupt table is a region of control registers that allows an OS to program MSI-X interrupt vectors on behalf of the driver.

The MSI-X Interrupt Pending Bit Array (PBA) is an array of bits, one for each MSI-X interrupt supported by the device.

The IO device interface may support programmable DMA register tables, descriptor formats, and control register formats, allowing specialized VF interfaces and user defined behaviors. The IO device PCIe interface logic may be programmed to map control registers and NIC memory regions with programmable access permissions (e.g., read, write, execute) to the VF BARs.

Match Processing Unit (MPU)

In an aspect of the described system, an MPU is provided to process a data structure. The data structure may comprise various types such as data packet, a management token, administrative command from a host, a processing token, a descriptor ring and various others. The MPU may be configured to perform various operations according to the type of data being processed or different purposes. For example, the operations may include table-based actions for processing packets, table maintenance operations such as writing a timestamp to a table or harvesting table data for export, administrative operations such as creating new queues or memory maps, gathering statistics, and various other operations such as initiating a bulk data processing that may result in writing any type of modified data to the host memory.

In some embodiments, the MPU may process a data structure in order to update the memory-based data structure or initiate an event. The event may or may not relate to modifying or updating a packet. For instance, the event may be administrative operations such as creating new queues or memory maps, gathering statistics, initiating a bulk data processing that may result in writing any type of modified data to the host memory, or performing calculations on descriptor rings, SGLs.

Figure 3:
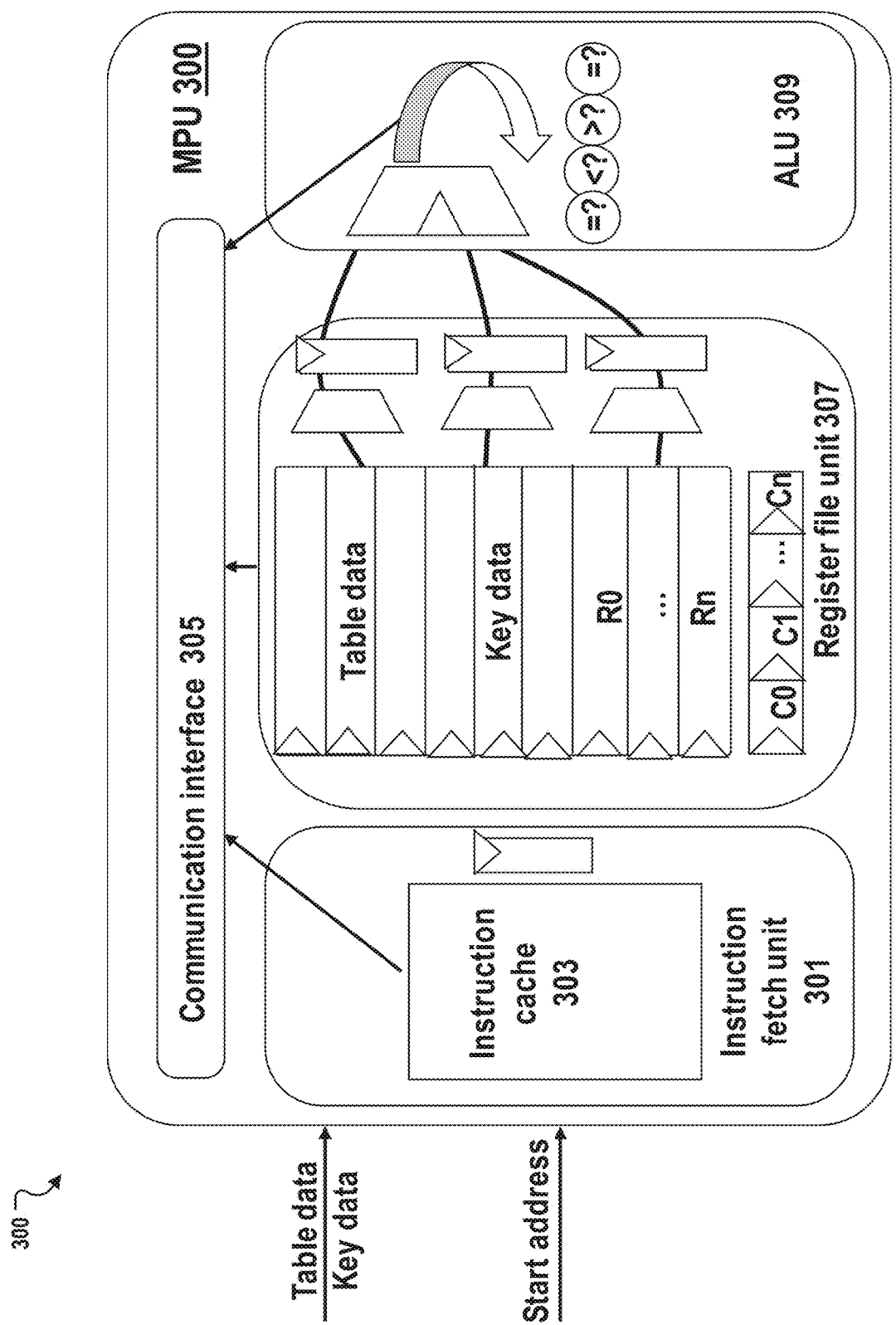
FIG. 3 depicts a non-limiting example of an MPU that may be employed by embodiments of the present disclosure.

FIG. 3 shows a block diagram of an MPU 300, in accordance with embodiments of the described system. In some embodiments, the MPU unit 300 may comprise multiple functional units, memories and at least a register file. For example, the MPU unit may comprise an instruction fetch unit 301, a register file unit 307, a communication interface 305, arithmetic logic units (ALUs) 309 and various other functional units.

In the illustrated example, the MPU unit 300 may comprise a write port or communication interface 305 allowing for memory read/write operations. For instance, the communication interface may support packets written to or read from an external memory (e.g., high bandwidth memory (HBM) of a host device) or an internal SRAM. The communication interface 305 may employ any suitable protocol such as Advanced Microcontroller Bus Architecture (AMBA) Advanced extensible Interface (AXI) protocol. AXI is a bus protocol for a high-speed/high-end on-chip bus protocol and has channels associated with read, write, address, and write response, which are respectively separated, individually operated, and have transaction properties such as multiple-outstanding address or write data interleaving. The AXI interface 305 may include features that support for unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

The MPU 300 may comprise an instruction fetch unit 301 configured to fetch instruction set from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 301 may comprise an instruction cache 303 for storing one or more programs. In some cases, the one or more programs may be loaded into the instruction cache 303 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 305. This provides flexibility to allow for executing different programs associated with different types of data using the same processing unit. In an example, when a management packet header vector (PHV) injected into the pipeline, for example to perform administrative table DMA operations or entry aging functions (i.e., adding timestamps), one of the management MPU programs may be loaded to the instruction cache to execute the management function. The instruction cache 303 can be implemented using various types of memories such as one or more SRAMs.

The one or more programs can be any programs such as P4 programs related to reading table, building headers, DMA to/from memory regions in HBM or in the host device and various other actions. The one or more programs can be executed in any stage of a pipeline as described elsewhere herein.

The MPU 300 may comprise a register file unit 307 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 307 may comprise a plurality of general-purpose registers (e.g., R0, R1, . . . Rn) which may be initially loaded with metadata values then later used to store temporary variables within execution of a program until completion of the program. For example, the register file unit 307 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In one embodiment, each register of the register file is 64 bits and may be initially loaded with special metadata values such as hash value from table, lookup, packet size, PHV timestamp, programmable table constant and the like, respectively.

In some embodiments, the register file unit 307 may also comprise comparator flags unit (e.g., C0, C1, . . . Cn) configured to store comparator flags. The comparator flags can be set by calculation results generated by the ALU which in return is compared with constant values in an encoded instruction to determine a conditional branch instruction. In an embodiment, the MPU may comprise eight one-bit comparator flags. However, it should be noted that MPU may comprise any number of comparator flag units each of which may have any suitable length.

The MPU 300 may comprise one or more functional units such as the ALU 309. The ALU may support arithmetic and logical operations on the values stored in the register file unit 307. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, the ALU may be configured to perform calculations on descriptor rings, SGLs, and control data structures loaded into the general-purpose registers from the host memory.

The MPU 300 may comprise various other functional units such as meters, counters, action insert unit and the like. For example, the ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be remarked as a result of overflowing the base band. This information might be used later to direct the packet to a different queue, where it may be more subject to delay or dropping in case of congestion. The counter may be implemented by the MPU instructions. The MPU may comprise one or more types of counters for different purposes. For example, the MPU may comprise performance counters to count MPU stalls. The action insert unit may be configured to push the register file result back to the PHV for header field modifications.

The MPU may be capable of locking a table. In some case, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table addresses, for example, one for the previous table write-back and another address lock for the current MPU program.

MPU Pipelining

A single MPU may be configured to execute instructions of a program until completion of the program. Alternatively or additionally, multiple MPUs may be configured to execute a program. In some embodiments, a table result may be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Any number of MPUs may be used for executing a program in order to meet a desirable performance. For instance, at least two, three, four, five, six, seven, eight, nine, or ten MPUs may be used to execute a program. Each MPU may execute at least a portion of the program or a subset of the instruction set. The multiple MPUs may perform the execution simultaneously or sequentially. Each MPU may or may not perform the same number of instructions. The configurations may be determined according to the length of program (i.e., number of instructions, cycles) and/or number of available MPUs. In some case, the configuration may be determined by an application instruction received from a main memory of a host device operably coupled to the plurality of MPUs.

P4 Pipelines

Figure 4:
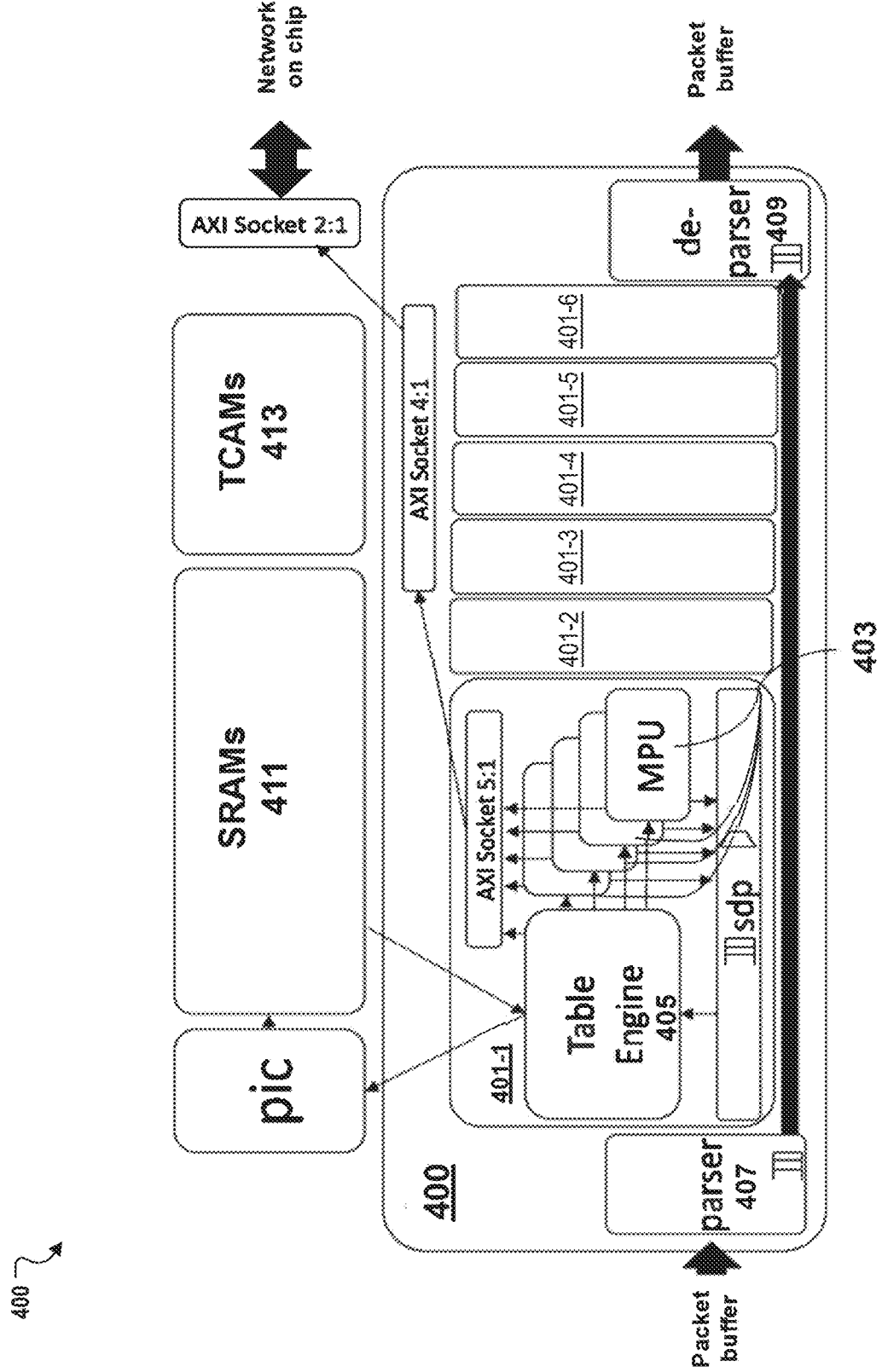
FIG. 4 depicts a non-limiting example of P4 ingress or egress pipeline (PIP pipeline) that may be employed by embodiments of the present disclosure.

In one aspect, a flexible, high performance match action pipeline which can execute a wide range of P4 programs is provided. The P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others. FIG. 4 shows a block diagram of an exemplary P4 ingress or egress pipeline (PIP pipeline) 400 in accordance with embodiments of the described system.

In some embodiments, the described system may support a match+action pipeline. The programmer or compiler may decompose the packet processing program into a set of dependent or independent table lookup and action processing stages (i.e., match+action) which are mapped onto the table engine and MPU stages respectively. The match+action pipeline may comprise a plurality of stages. For example, a packet entering the pipeline may be first parsed by a parser (e.g., parser 507) according to the packet header stack specified by a P4 program. This parsed representation of the packet may be referred to as parsed header vector. The parsed header vector may then be passed through stages (e.g., stages 401-1, 401-2, 401-3, 401-4, 401-5, 401-6) of ingress match+action pipeline, wherein each stage is configured to match one or more parsed header vector fields to tables, then updates the PHV and/or table entries according to the actions specified by the P4 program. In some instances, if the required number of stages exceeds the implemented number of stages, a packet may be recirculated for additional processing. In some cases, the packet payload may travel in a separate first-in-first-out (FIFO) queue until it is reassembled with its PHV in the de-parser (e.g., de-parser 409). The de-parser may rewrite the original packet according to the PHV fields which have been modified (e.g., added, removed, or updated). In some cases, the packet processed by the ingress pipeline may be placed in a packet buffer for scheduling and possible replication. In some cases, once the packet is scheduled and leaves the packet buffer, it may be parsed again to create an egress parsed header vector. The egress parsed header vector may be passed through a sequence of stages of match+action pipeline in a similar fashion of the ingress match+action pipeline, after which a final de-parser operation may be executed before the packet is sent to its destination interface or recirculated for additional processing.

In some embodiments, the ingress pipeline and egress pipeline may be implemented using the same physical block or processing unit pipeline. In some embodiments, the PIP pipeline 400 may comprise at least one parser 407 and at least one de-parser 409. The PIP pipeline 400 may comprise multiple parsers and/or multiple de-parsers. The parser and/or de-parser may be a P4 compliant programmable parser or de-parser. In some cases, the parser may be configured to extract packet header fields according to P4 header definitions and place them in the PHV. The parser may select from any fields within the packet and align the information from the selected fields to create a packet header vector. In some cases, after passing through a pipeline of match+action stages, the de-parser block may be configured to rewrite the original packet according to the updated PHV.

The PHV produced by the parser may have any size or length. For example, the PHV may be a least 512 bits, 256 bits, 128 bits, 64 bits, 32 bits, 8 bits or 4 bits. In some cases, when a long PHV (e.g., 6 Kb) is desired to contain all relevant header fields and metadata, a single PHV may be time division multiplexed (TDM) across several cycles. This TDM capability provides benefit allowing the described system to support variable length PHVs, including very long PHVs to enable complex features. A PHV length may vary as the packet passes through the match+action stages.

The PIP pipeline may comprise a plurality of match+action stages. After the parser 407 produces the PHV, the PHV may be passed through the ingress match+action stages. In some embodiments, the PIP pipeline may be implemented using multiple stage units 401-1, 401-2, 401-3, 401-4, 401-5, 401-6, each of which may comprise a table engine 405 and multiple MPUs 403. The MPU 403 can be same as the MPU as described in FIG. 4. In the illustrated example, four MPUs are used in one stage unit. However, any other number of MPUs, such as at least one, two, three, four, five, six, seven, eight, nine, or ten can be utilized or grouped with a table engine.

A table engine 405 may be configured to support per-stage table match. For example, the table engine 405 may be configured to hash, lookup, and/or compare keys to table entries. The table engine 405 may be configured to control table match process by controlling the address and size of the table, PHV fields to use as a lookup key, and MPU instruction vector which defines the P4 program associated with the table. A table result produced by the table engine may be distributed to the multiple MPUs 403.

The table engine 405 may be configured to control a table selection. In some cases, upon entering a stage, the PHV may be examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (IPv4), Internet Protocol version 6 (IPv6) and Multiprotocol Label Switching (MPLS)) or the next table ID as determined by the preceding stage. In some cases, the incoming PHV may be analyzed by the table selection logic, which then generates a table selection key and compares the result using a TCAM to select the active tables. The table selection Key may be used to drive table hash generation, table data comparison, and associated data into the MPUs.

In some embodiments, the table engine 405 may comprise a hash generation unit. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset may be added to create the memory index. The memory index may be sent to the DRAM or SRAM array and to perform the read.

In some cases, the table engine 405 may comprise a TCAM control unit. The TCAM control unit may be configured to allocate memory to store multiple TCAM search tables. In an example, a PHV table selection key may be directed to a TCAM search stage before a SRAM lookup. TCAM search tables can be configured to be up to 1024 bits wide and as deep as TCAM resources permit. In some cases, multiple TCAM tables may be carved from the shared quadrant TCAM resources. The TCAM control unit may be configured to allocate TCAMs to individual stages so that to prevent TCAM resource conflicts, or allocate TCAM into multiple search tables within a stage. The TCAM search index results may be forwarded to the table engine for SRAM lookups.

The PIP pipeline 400 may comprise multiple stage units 401-1, 401-2, 401-3, 401-4, 401-5, 401-6. The PIP pipeline may comprise any number of stage units such as at least two, three, four, five, six, seven, eight, nine, ten sage units that can be used within the PIP pipeline. In the illustrated example, six match+action stages units 401-1, 401-2, 401-3, 401-4, 401-5, 401-6 are grouped into a set. The set of stages units may share a common set of SRAMs 411 and TCAMs 413. The SRAMs 411 and TCAMs 413 may be component of the PIP pipeline. This arrangement may allow the six stage units to divide match table resources in any suitable proportion which provides convenience to the compiler and easing the complier's task of resource mapping. Any suitable number of SRAM resources and any suitable number of TCAM resources may be used by each PIP pipeline. For example, the illustrated PIP pipeline may be coupled to ten SRAM resources and four or eight TCAM resources. In some instances, TCAMs may be fused vertically or horizontally for a wider or deeper search.

Extended P4 Pipelines

In one aspect, the described system may support an extended P4 programmable pipeline to allow for direct interfacing with the host driver. The extended P4 programmable pipeline implements the IO device interface as described above. For example, the P4 programmed DMA interfaces may be directly coupled to the host VFs as well as ARM CPU or offload engine interfaces. The extended P4 pipeline may handle required DMA operations and loops. The extended P4 pipeline may include features, including but not limited to, stateless NIC offloads such as TSO and RSS; storage exchange table-style transaction servicing in the extended P4 pipeline; fine grained load balancing decisions that can be extended to individual data structures of performance critical applications, such as DPDK or key value matching; TCP flow termination and initiation for proxy services; RDMA over converged Ethernet (RoCE) and similar remote direct memory access (RDMA) protocol support; custom descriptor and SGL formats can be specified in P4 to match data structures of performance critical applications; new device and VF behaviors can be modelled using P4 programs coupled with host driver development, and various other features.

Data may be transmitted between the packetized domain in the P4 pipeline to/from the memory transaction domain in the host and NIC memory systems. This packet to memory transaction conversion may be performed by the extended P4 pipelines that include DMA write (TxDMA) and/or DMA read (RxDMA) operations. The extended P4 pipeline includes TxDMA may also be referred to as Tx P4 or TxDMA and the extended P4 pipeline includes RxDMA may also be referred to as Rx P4 throughout this specification. The extended P4 pipelines may comprise the same match+action stages in the P4 pipeline, and a payload DMA stage at the end of the pipeline. Packets may be segmented or reassembled into data buffers or memory regions (e.g., RDMA registered memory) according to the extended P4 programs. The payload DMA stage may be a P4 extension which enables the programmable P4 network pipeline extended to the host memory system and driver interface. This P4 extension allows custom data structures and applications interactions to be tailored to application or container needs.

The match table utilized in the extended P4 pipeline may be programmable tables. A stage of an extended P4 pipeline may include multiple programmable tables which may exist in SRAM, NIC DRAM, or host memory. For example, host memory structures may include descriptor rings, SGLs, and control data structures which can be read into the register file unit of the MPU for calculations. The MPU may add PHV commands to control DMA operations to and from host and NIC memory and insert DMA commands into the PHV for execution by the payload DMA stage. The extended P4 programs may include, for example, completion queue events, interrupts, timer set, and control register writes and various other programs.

Resource Fairness Transmit Scheduling

In some embodiments, the scheduler and TxDMA pipeline software provided through the IO device employed by the described resource fairness enforcement system uses P4 meters to enforce bandwidth fairness between LIFs. For example, as the TxDMA P4+ programs build DMA commands to create the packet to be transmitted, a meter assigned to the LIF is called to report the number of bytes being transmitted. This meter is programmed with a maximum data rate and will stop a LIF from being scheduled when the rate is exceeded. Later, the meter can add tokens to return the LIF to the scheduling pool. In some embodiments, as a packet passes through TxDMA, the fairness meter associated with the packet LIF is called. Instead of charging the meter with a number of bytes, the fairness meter is charged with 1 packet. If a LIF exceeds the programmed packet per second (PPS) limit, it will not be scheduled again until its meter tokens are replenished, and the PPS drops below the allowed limit.

Figure 5A:
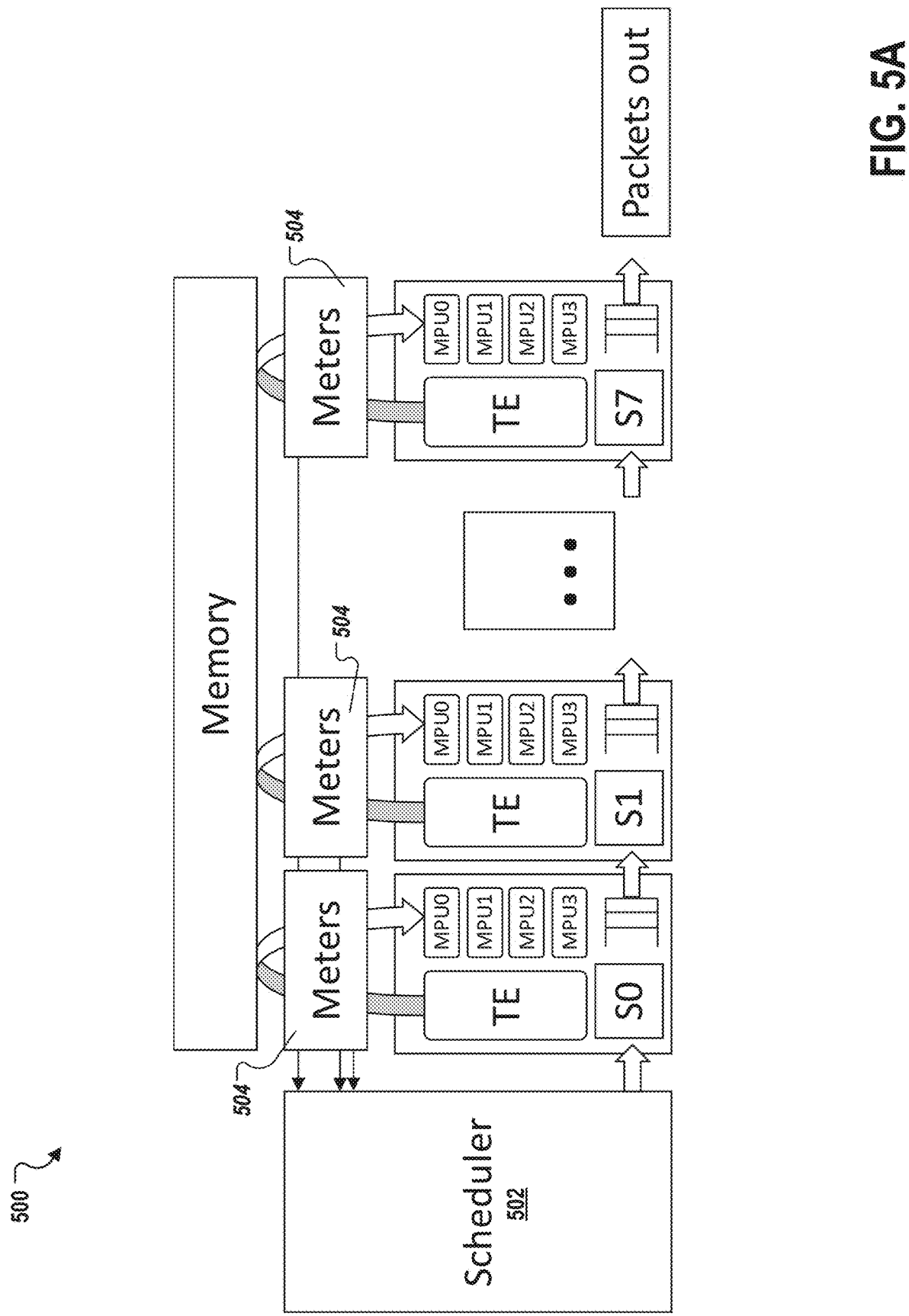
FIG. 5A depicts an example packet transmit path that may be employed by embodiments of the present disclosure.
Figure 5B:
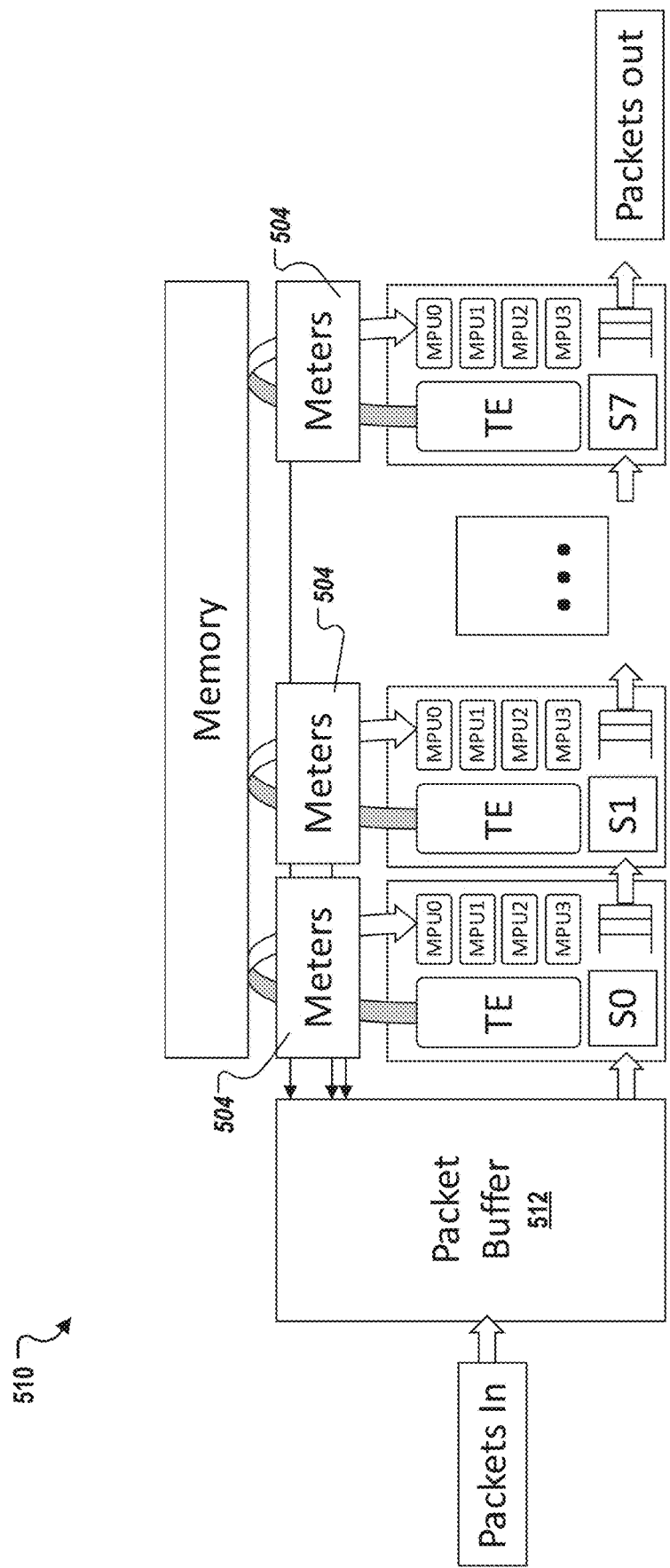
FIG. 5B depicts an example packet receive path that may be employed by embodiments of the present disclosure.

FIGS. 5A and 5B each depict example paths 500 and 510 respectively that can be employed within an IO device. The paths provide measure a metric for a resource used by, for example, an application, user, customer, network connection, device, and so forth. The paths are programmable to determine the granularity and dimension of what is being measuring. In some embodiments, the IO device is a smart-NIC plugged into a server that the server uses to connect to a network, such as the network 810 depicted in FIG. 8. In some embodiments, the IO device is an appliance (e.g., a stand-alone box) that a server plugs into to reach a network. In some embodiments, the IO device is a router or a switch and can be used to interrupt network traffic based on the policies programmed according to aspect of this disclosure. In some embodiments, the meters 504 are hardware meter.

FIG. 5A depicts an example packet transmit path 500 that may be provided by an IO device employed within the described resource fairness enforcement system. As depicted, the scheduler 502 reacts to meter input to select amongst the available queues and inject the input. For example, requests received from a server may be queued in the scheduler 502. When a threshold for a resource is met in at least one of the meters 504 for requests for the server, the requests will not be dequeued until the meter allows (e.g., a time threshold has been met, or a number of requests have been serviced). The stages (S1 through S7) run programs in their MPUs which track resource usage, packet content and database content to associate used resources with meters 504. The meters 504 track event rates versus configured policies, feedback on/off control to scheduler and to MPUs. The packets are then provided as output.

FIG. 5B depicts an example packet receive path 510 that may be provided by an IO device employed within the described resource fairness enforcement system. As depicted, packets are received by the packet buffer 512. The packets may be received from devices, such as user devices 802-806 depicted in FIG. 8. The stages (S1 through S7) run programs in their MPUs which track resource usage, packet content and database content to associate used resources with meters 504. The meters 504 track event rates versus configured policies, feedback on/off control to packet buffer and to MPUs (MPUs can mark packets to drop). The packets are then provided as output. With the packet receive path 510, when a threshold is reached for a certain recourse, packets from the offending source are rejected or slowed (e.g., only a certain number of packets are accepted) until a determined time period has passed or a threshold number of packets (from that same source or otherwise) have been received.

The example paths 500 and 510 can be employed to enforce targeted resources fairness in a programmable fashion. Users can define what metrics or multiple metrics to meter. For example, when packets are processed through a pipeline, programmable logic is employed to determine metrics regarding resources, such as packet size, bandwidth, cryptography, memory, storage transformation, item operation, and so forth. The meters 504 are each associated with a resource or grouping of resources and used to persist the number events, over a determined time period (e.g., per second), for a type of resource that a source has used. In some embodiments, when a packet or request arrives the meters associated with the requested resources are determined and metadata is added to the header that includes the meters 504 associated with each resource or group of resources. The metadata is then then used to determine whether the packet should be dropped when a threshold for a resource has been met. By dropping packets, the source is notified (because it has to resend the data) that a resource is being overusing a resource.

In some embodiment, the meters 504 are programed to extract bits of information that apply to resources (e.g., bytes received, bytes encrypted, instructions needed to execute the request) or group of resources. In some embodiments, the resources within a group are weighted according to a value assigned to each respective resource and meter according to the weights to, for example. encourage or discourage use of a particular resource or group of resources. For example, meters 504 can be configured to prevent a denial of service attack.

LIF Resource Measurement

In some embodiments, a LIF which is acting as a noisy neighbor should be programmed with a lower PPS limit than a LIF that uses resources lightly. For example, when a LIF is created, it can be assigned a high default PPS limit, as it is not yet known if the LIF will be noisy. A LIF resource measurement program continuously runs on the ARM to find noisy LIFs and lower their PPS limit accordingly.

In some embodiments, the ARM uses performance measurement hardware, such as depicted in FIG. 5A, to determine the resource usage of each LIF. For example, a LIF measurement interval is chosen, and the ARM programs P4 and P4+ pipelines to gather all performance data for the target LIF. Performance hardware in the MPU counts every table access, executed instruction, stall event, fence event, and other metrics for every packet associated with the LIF under measurement. At the end of the measurement interval, the ARM harvests all the performance counters and stores them in an internal database. The ARM then measures the next LIF by programming the performance monitor hardware to count on the next LIF ID. For example, if there are 1000 configured LIFs and a 1 millisecond measurement interval is used, every LIF will be sampled for resource consumption once per second.

The following provides example performance counters that may be tracked in the MPU:

phv_executed—number of tables run for the LIF
cycles—number of clock cycles a PHV for the LIF occupied an MPU
inst_executed—number of instructions executed for the LIF
icache_miss—number of instruction cache misses encountered by the LIF
hazard_stall—number of MPU pipeline hazards stalls encountered by the LIF
phvwr_stall—number of PHVWR stalls encountered by the LIF
memwr_stall—number of MEMWR stalls encountered by the LIF
tblwr_stall—number of table write stalls encountered by the LIF
fence_stall—number of fence stalls encountered by the LIF In some embodiments, once the internal database of performance information is gathered, the ARM runs a function to determine how heavy this LIF's resource usage is per packet. As an example, such a function may comprise the following:

$$\text{LIF.resoruce weight} = (\text{sum}(\text{instructions}) + T^* \text{sum}(\text{tables}))/\text{total\_packets},$$

where LIF.resoruce weight represents the amount of internal resources used per packet by this LIF. The number can be scaled and programmed into the LIF's resource fairness meter, such that a high resource usage per packet will result in a lower PPS limit for this LIF.

Tx Implementation

The P4+ programming to implement metered resource fairness may include a stage to add the resource fairness meter table, programmed to index a meter by LIF and charge one packet to the meter unless the drop bit is set. A stage 0 may be included to also add one instruction to set PHV.debug if it matches the LIF under measurement (phvwr d.debug, p.debug). The Tx scheduler can be programmed to accept the two per LIF meter arrays, one for bandwidth and one for resources, and not schedule tokens on any LIF which asserts its meter limit bit. The performance impact to pipelines and P4/P4+ programs is negligible, only the addition one instruction in stage 0 and one meter table in a later stage is required. Also, the PHV.debug bit will carry through the P4 pipeline.

Resource Fairness Receive Policing

In some embodiments, when packets that use excessive P4/P4+ resources is received by the IO device, the packet buffer may fill until it is forced to drop. Thus, a resource heavy neighbor on receive can cause resource light neighbors to lose packets. In some embodiments, resource fairness on receive is implemented by policing LIFs which exceed their resource limit. In some embodiments, the P4 ingress pipeline adds a meter early in the pipeline which meters per LIF PPS. In some embodiments, when a packet exceeds its LIF meter threshold, the drop bit is set immediately and the PHV proceeds using minimal pipeline resources until it is dropped in the packet buffer. In some embodiments, meter limits are programmed by the ARM using the same technique described for the transaction. One difference is that the fairness meter and performance measurement can only be performed after the LIF is known, so in P4 Ingress this must be done after the initial forwarding but before the resource heavy features are applied. Another difference is that it is possible to use a three-color meter, wherein the MPU program can drop all red metered packets, but randomly drop yellow metered packets.

Exemplary Process

Figure 6:
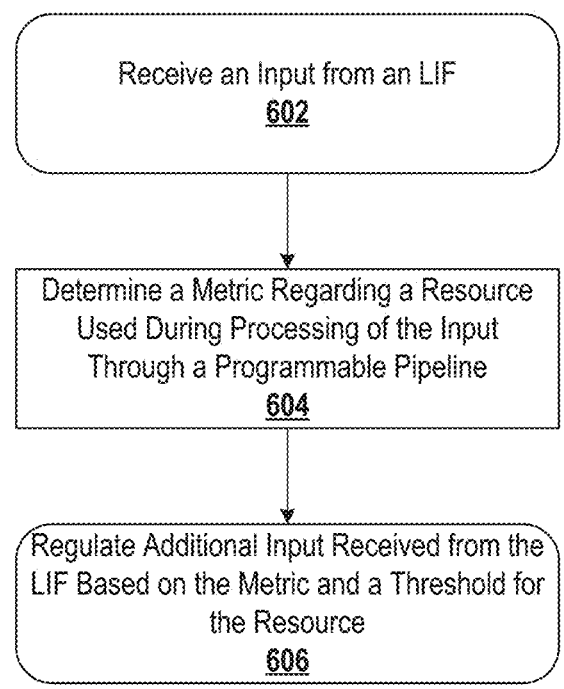
FIG. 6 depicts a flowchart of a non-limiting exemplary process that can be implemented by embodiments of the present disclosure.

FIG. 6 depicts a flowchart of an exemplary process 600. The exemplary process 600 can be implemented by the various elements of the described resource fairness enforcement system. The flowchart generally shows how received from a LIF is regulated based on a metric and a threshold for at least one resource. For clarity of presentation, the description that follows generally describes the exemplary process 600 in the context of FIGS. 1-5B, 7, and 8. However, it will be understood that the process 600 may be performed, for example, by any other suitable system, environment, software, and hardware, or a combination of systems, environments, software, and hardware as appropriate. In some embodiments, various operations of the process 600 can be run in parallel, in combination, in loops, or in any order.

At 602, an input is received from a LIF. In some embodiments, the input is received by a scheduler, wherein the input originated from a server, and wherein the input is queued by the scheduler. In some embodiments, the programmable IO device comprises a smart NIC. In some embodiments, the smartNIC is plugged into a server, and wherein the server connects to a network through the smartNIC. In some embodiments, the programmable IO device comprises is an appliance, and wherein a server connects to a network through the appliance. In some embodiments, the programmable IO device comprises a router or a switch, and wherein the programmable IO device interrupts network traffic. From 602, the process 600 proceeds to 604.

At 604, a metric regarding at least one resource used during a processing of the input through a programmable pipeline is determined by at least one meter. In some embodiments, the programmable pipeline comprises a predetermined number of table engines and MPU pipeline stages. In some embodiments, the programmable pipeline breaks down the processing of the input into a series of table lookups or matches and respective processing actions. In some embodiments, each of the MPU pipeline stages comprise an MPU performing table-based actions. In some embodiments, the MPU executes a targeted program, determined based on a domain specific instruction set, with results of the table lookups and headers from the input as parameters to determine table updates and header rewrite operations. In some embodiments, the metric comprises an amount of the at least one resource used, or a number times the at least one resource was used, during the processing of the input or over a measurement interval. In some embodiments, the measurement interval is per second. In some embodiments, the metric is based on a granularity or a dimension of the at least one resource. In some embodiments, the at least one resource comprises packet size, bandwidth, cryptography, memory, storage transformation, or item operation. In some embodiments, the at least one resource comprises table access, executed instructions, a stall event, or a fence event. In some embodiments, the metric is determined for a group of resources. In some embodiments, each of the resources in the group of resources are weighted, and wherein the at least one meter is determined according to the weighted values. In some embodiments, the programmable pipeline comprises a packet receive path, wherein the input comprises a packet, and wherein the input is received by a packet buffer. In some embodiments, the programmable pipeline comprises a packet transmit path. In some embodiments, the at least one meter comprises a hardware meter. From 604, the process 600 proceeds to 606.

At 606, additional input received from the LIF is regulated based on the metric and a threshold for the at least one resource. In some embodiments, regulating the additional input received from the LIF comprises rejecting the additional input when the metric exceeds the threshold. In some embodiments, the metric regarding the at least one resource is redetermined after a time threshold has been met, or a number of other inputs received from other LIFs have been processed. In some embodiments, regulating the additional input received from the LIF comprises accepting the additional input when the redetermined metric is below the threshold. In some embodiments, regulating the additional input received from the LIF comprises not dequeuing the additional inputs when the metric exceeds the threshold. In some embodiments, the metric regarding the at least one resource is redetermined after a time threshold has been met, or a number of other inputs received from other LIFs have been dequeued, wherein regulating the additional input received from the LIF comprises dequeuing the additional input when the redetermined metric is below the threshold. From 606, the process 600 end.

Computer Systems

Figure 7:
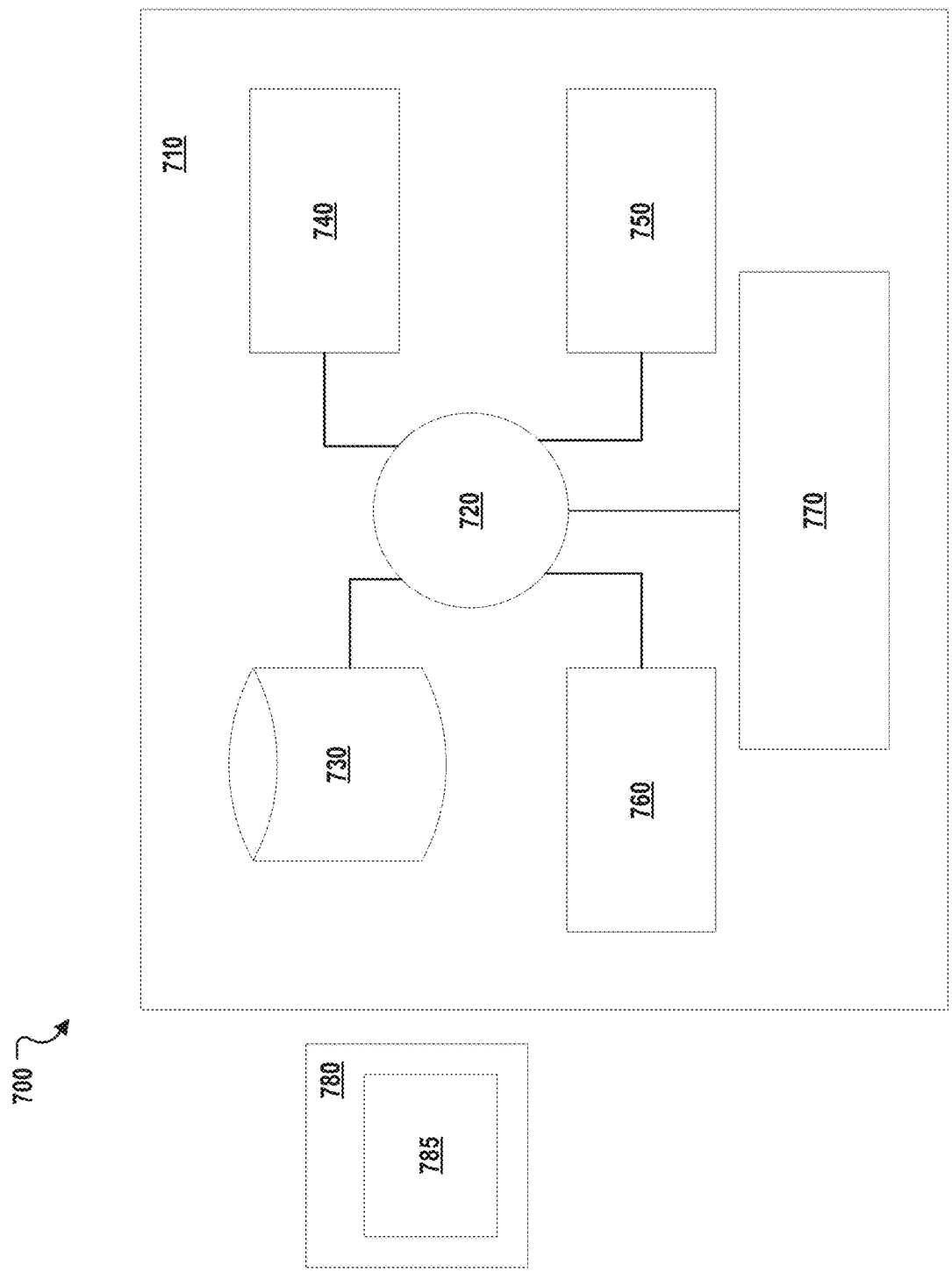
FIG. 7 depicts a non-limiting example computer system that can be programmed or otherwise configured to implement methods or systems of the present disclosure.

Computer systems are provided herein that can be used to implement methods or systems of the disclosure. FIG. 7 depicts an example a computer system 700 that can be programmed or otherwise configured to implement methods or systems of the present disclosure. For example, the computing device 710 can be programmed or otherwise configured to process input, such a packet, received from a LIF through the IO subsystem 770. As depicted, the computer system 700 includes a computing device 710 and an optional electronic display 780. In some embodiments, the computing device 710 is substantially similar to the computing system 120 depicted in FIG. 1.

In the depicted embodiment, the computing device 710 includes a CPU (also "processor" and "computer processor" herein) 720, which is optionally a single core, a multi core processor, or a plurality of processors for parallel processing. The computing device 710 also includes memory or memory location 730 (e.g., random-access memory, read-only memory, flash memory); electronic storage unit 740 (e.g., hard disk); communication interface 750 (e.g., network adapter) for communicating with one or more other systems; peripheral devices 760 (e.g., cache, other memory, data storage or electronic display adapters), and IO subsystem 770 (e.g., an IO device, such as a smartNlC). The memory 730, the electronic storage unit 740, the communication interface 750, the peripheral devices 760, and the 10 subsystem 770 are in communication with the CPU 720 through a communication bus (solid lines), such as a motherboard.

In some embodiments, the CPU 720 can execute a sequence of machine-readable instructions, which can be embodied in a program or software. The instructions may be stored in a memory location, such as the memory 730. The instructions can be directed to the CPU 720, which can subsequently program or otherwise configure the CPU 720 to implement methods of the present disclosure. Examples of operations performed by the CPU 720 can include fetch, decode, execute, and write back. In some embodiments, the CPU 720 is part of a circuit, such as an integrated circuit. One or more other components of the computing device 710 can be optionally included in the circuit. In some embodiments, the circuit is an ASIC or a Field Programmable Gate Array (FPGA).

In some embodiments, the 10 subsystem 770 (e.g., the above described 10 device) comprises an expansion card, such as a smartNlC, that is connected with the CPU 720 via PCIe. In some embodiments, the 10 subsystem 770 is completely programmable ASIC engine. In some embodiments, an ASIC engine is tailored to a specific subset of functions, such as compression and checksum, while another engine is dedicated for symmetric cryptography. Such embodiments provide for a packet transmit path or a packet receive path such as depicted in FIGS. 5A and 5B respectively.

In some embodiments, the electronic storage unit 740 includes a data storage unit (or data repository) for storing data. In some embodiments, the electronic storage unit 740 stores files, such as drivers, libraries, images, and saved programs. In some embodiments, the electronic storage unit 740 stores user data, e.g., user preferences and user programs. In some embodiments, the computing device 710 includes one or more additional data storage units that are external, such as located on a remote server that is in communication through an intranet or the interne.

Figure 8:
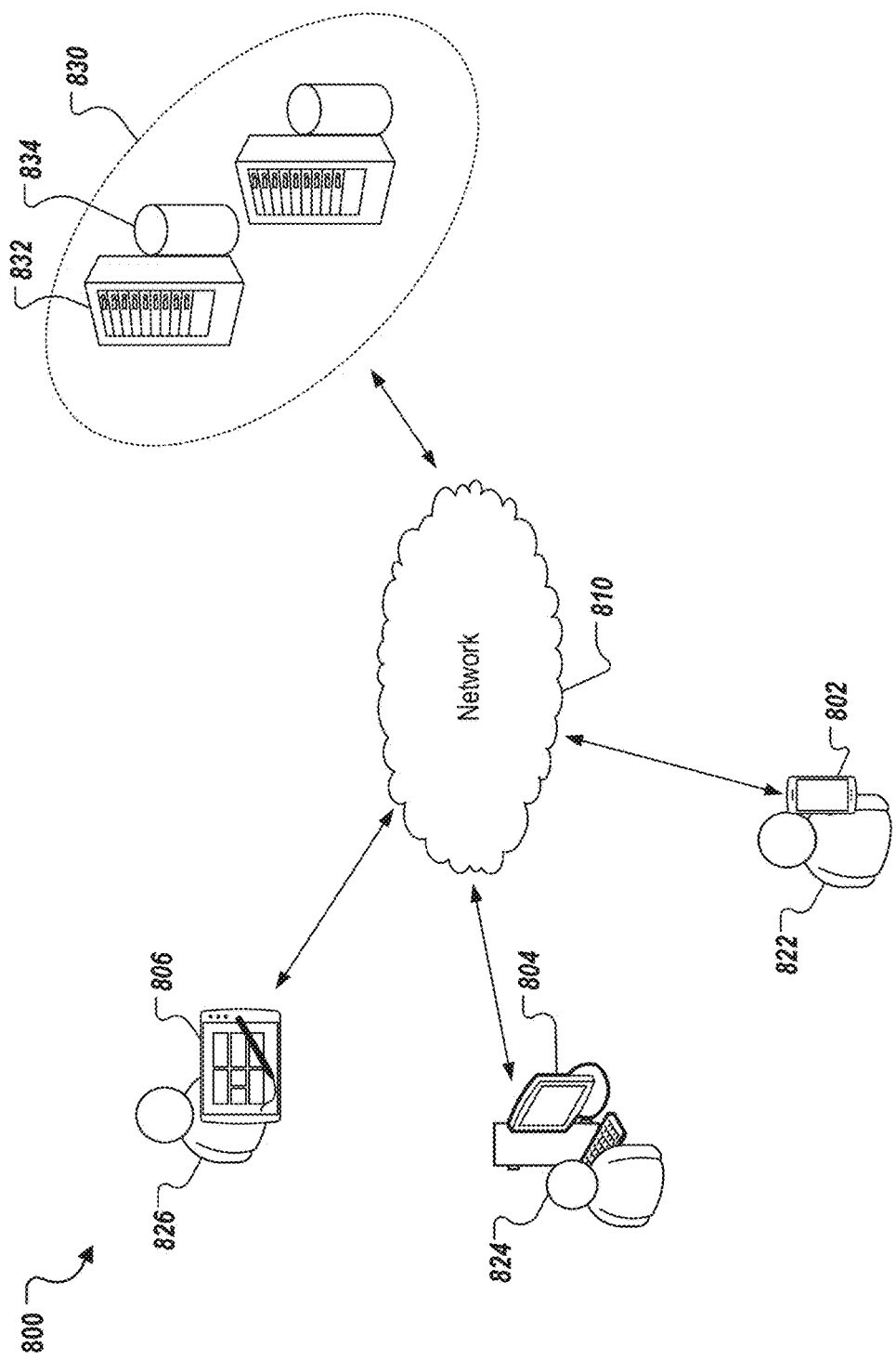
FIG. 8 depicts a non-limiting example environment where implementations of the present disclosure can be employed.

The computing device 710 is optionally operatively coupled to a network, such as the network 810 depicted and described in FIG. 8, with the aid of the communication interface 750. In some embodiments, the computing device 710 communicates with one or more remote computer systems through the network. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 710 via a network.

In some embodiments, methods as described herein are implemented by way of machine (e.g., computer processor) executable code stored on an electronic storage location of the computing device 710, such as, for example, on the memory 730 or the electronic storage unit 740. In some embodiments, the CPU 720 is adapted to execute the code. In some embodiments, the machine executable or machine-readable code is provided in the form of software. In some embodiments, during use, the code is executed by the CPU 720. In some embodiments, the code is retrieved from the electronic storage unit 740 and stored on the memory 730 for ready access by the CPU 720. In some situations, the electronic storage unit 740 is precluded, and machine-executable instructions are stored on the memory 740. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 710 can include or be in communication with the electronic display 780. In some embodiments, the electronic display 780 provides a user interface (UI) 785.

Example Environment

FIG. 8 depicts an example environment 800 that can be employed to execute implementations of the present disclosure. The example system 800 includes computing devices 802, 804, and 806; a back-end system 830; and a network 810.

In some embodiments, the network 810 includes a LAN, WAN, the Internet, or a combination thereof, and connects web sites, devices (e.g., the computing devices 802, 804, and 806) and back-end systems (e.g., the back-end system 830). In some embodiments, the network 810 includes the Internet, an internet, and/or extranet, or an intranet and/or extranet that is in communication with the Internet. In some embodiments, the network 810 includes a telecommunication and/or data network. In some embodiments, the network 810 can be accessed over a wired and/or a wireless communications link. For example, mobile computing devices (e.g., the smartphone device 802 and the tablet device 806), can use a cellular network to access the network 810.

In the depicted example environment 800, the back-end system 830 includes at least one server device 832 employing the described resource fairness enforcement system and at least one data store 834. In some embodiments, the back-end system 830 may be deploy within a data center that provides services, such as a web service, the computing devices 802, 804, and 806. The described resource fairness enforcement system may be employed within the example environment 800 to process packets received from the users' devices 802, 804, and 806 through the network 810.

In some embodiments, the at least one server device 832 is sustainably similar to computing device 710 depicted in FIG. 7. In some embodiments, the at least one server device 832 is server-class hardware type devices. In some embodiments, back-end system 830 includes computer systems using clustered computers and components to act as a single pool of seamless resources when accessed through the network 810. For example, such implementations may be used in data center, cloud computing, storage area network (SAN), and network attached storage (NAS) applications. In some embodiments, back-end system 830 is deployed using a virtual machine(s).

In some embodiments, the data store 834 is a repository for persistently storing and managing collections of data. Example data stores include data repositories, such as a database as well as simpler store types, such as files, emails, and so forth. In some embodiments, the data store 834 includes a database. In some embodiments, a database is a series of bytes or an organized collection of data that is managed by a database management system (DBMS).

In some embodiments, the at least one server system 832 hosts one or more computer-implemented services with which users 822, 824, and 826 can interact using the respective computing devices 802, 804, and 806.

In some examples, the users 822, 824, and 826 interact with the services provided by the back-end system 830 through a graphical user interface (GUI) or application that is installed and executing on their respective computing devices 802, 804, and 806. In some examples, the computing devices 802, 804, and 806 provide viewing data to screens with which the users 822, 824, and 826 can interact. In some embodiments, the computing devices 802, 804, 806, and 832 are sustainably similar to computing device 710 depicted in FIG. 7. The computing devices 802, 804, 806 may each include any appropriate type of computing device such as a desktop computer, a laptop computer, a handheld computer, a tablet computer, a PDA, a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 802 is a smartphone, the computing device 804 is a tablet-computing device, and the computing device 806 is a desktop computing device. Three user computing devices 802, 804, and 806, are depicted in FIG. 8 for simplicity. It is contemplated, however, that implementations of the present disclosure can be realized with any of the appropriate computing devices, such as those mentioned previously. Moreover, implementations of the present disclosure can employ any number of devices as required.

Processing Devices and Processors

In some embodiments, the platforms, systems, media, and methods described herein include a computer, or use of the same. In further embodiments, the computer includes one or more hardware CPUs or general purpose graphics processing units (GPGPUs) that carry out the device's functions by providing chains of operation to an IO subsystem provided through a SmartNIC connected to the CPU or GPGPU via PCIe. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc (CD)-Read only Memories (ROMs), Digital Versatile Disks (DVDs), flash memory devices, magnetic disk drives, magnetic tapes drives, optical disk drives, and cloud computing-based storage. In further embodiments, the storage and/or memory device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. In some embodiments, a computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

While preferred embodiments of the present subject matter have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments of the subject matter described herein may be employed in practicing the described system.

What is claimed is:

1. An input output (IO) device comprising:
a memory unit, the memory unit having instructions stored thereon which, when executed by the IO device, cause the IO device to perform operations comprising:
receiving input from a first logical interface (LIF) and a second LIF;
tracking a first metric regarding a usage per packet of at least one resource when processing input from the first LIF and tracking a second metric regarding a usage per packet of the at least one resource when processing input from the second LIF; and
regulating additional input received from the first and second LIFs by comparing the first metric to a first threshold assigned to the first LIF for the at least one resource and by comparing the second metric to a second threshold assigned to the second LIF for the at least one resource, wherein the first and second thresholds are different.

2. The IO device of claim 1, wherein regulating the additional input received from the LIF comprises rejecting the additional input when the first and second metrics exceed the first and second thresholds.

3. The IO device of claim 2, wherein the operations comprise:
redetermining the first metric regarding the at least one resource after a time threshold has been met, or a number of other inputs received from other LIFs have been processed, wherein regulating the additional input received from the LIF comprises accepting the additional input when the redetermined metric is below the first threshold.

4. The IO device of claim 1, wherein regulating the additional input received from the LIF comprises not dequeuing the additional input when the first metric exceeds the first threshold.

5. The IO device of claim 4, wherein the operations comprise:
redetermining the first metric regarding the at least one resource after a time threshold has been met, or a number of other inputs received from other LIFs have been dequeued, wherein regulating the additional input received from the LIF comprises dequeuing the additional input when the redetermined metric is below the first threshold.

6. The IO device of claim 1, wherein the operations comprises processing the input through a programmable pipeline, the programmable pipeline comprises a pre-determined number of table engines and match processing unit (MPU) pipeline stages,
wherein the programmable pipeline breaks down the processing of the input into a series of table lookups or matches and respective processing actions, and
wherein each of the MPU pipeline stages comprise an MPU performing table-based actions.

7. The IO device of claim 6, wherein the MPU pipeline stages execute a targeted program, determined based on a domain specific instruction set, with results of the table lookups and headers from the input as parameters to determine table updates and header rewrite operations.

8. The IO device of claim 1, wherein the usage per packet of the at least one resource comprises a number of operations or events associated with the at least one resource, wherein the operations or events associated with the at least one resource comprise table access, executed instructions, a stall event, or a fence event.

9. The IO device of claim 1, wherein the first and second metrics are tracked by at least one meter, wherein the at least one meter is programmable and is further programmed to track a metric for a group of resources,
wherein each of the resources in the group of resources are weighted using weighted values, and wherein the at least one meter is programmed according to the weighted values.

10. The IO device of claim 1, wherein the operations comprises processing the input through a programmable pipeline, the programmable pipeline comprises a packet receive path and a packet transmit path, wherein the input comprises a packet, and wherein the input is received by a packet buffer.

11. The IO device of claim 10, wherein the input is received by a scheduler, wherein the input originated from a server, and wherein the input is queued by the scheduler.

12. The IO device of claim 1, wherein the IO device comprises a smart network interface card (NIC).

13. One or more non-transitory computer-readable storage media coupled to an input output (IO) device and having instructions stored thereon which, when executed by the IO device, cause the IO device to perform operations comprising:
receiving input from a first logical interface (LIF) and a second LIF;
tracking a first metric regarding a usage per packet of at least one resource when processing input from the first LIF and tracking a second metric regarding a usage per packet of the at least one resource when processing input from the second LIF; and
regulating additional input received from the first and second LIFs by comparing the first metric to a first threshold assigned to the first LIF for the at least one resource and by comparing the second metric to a second threshold assigned to the second LIF for the at least one resource, wherein the first and second thresholds are different.

14. An input output (IO) device comprising:
a plurality of pipelined stages; and
a plurality of hardware meters, each of which is assigned to a determine whether received packets are permitted to enter a respective stage of the plurality of pipelined stages, wherein each of the plurality of hardware meters is configured to:
track a first metric regarding a usage of a hardware resource in the respective stage when processing packets received from a first logical interface (LIF),
track a second metric regarding a usage of a hardware resource in the respective stage when processing packets received from a second LIF,
block the packets received from the first LIF from being processed by the respective stage when the first metric satisfies a first threshold, and
block the packets received from the second LIF from being processed by the respective stage when the second metric satisfies a second threshold, wherein the first and second thresholds are different.

15. The IO device of claim 14, wherein the 10 device is configured to redetemine the first metric regarding the usage of the hardware resource in a respective stage after a time threshold has been met, or a number of other packets received from other LIFs have been processed.

16. The IO device of claim 14, wherein the 10 device is configured to redetemine the first metric regarding the usage of the hardware resource in a respective stage after a time threshold has been met, or a number of other packets received from other LIFs have been dequeued.

17. The IO device of claim 14, wherein the plurality of pipeline stages comprises a pre-determined number of table engines and match processing unit (MPU) pipeline stages, wherein the plurality of pipeline stages break down processing of the received packets into a series of table lookups or matches and respective processing actions, wherein each of the MPU pipeline stages comprise an MPU performing table-based actions.

18. The IO device of claim 17, wherein the MPU pipeline stages execute a targeted program, determined based on a domain specific instruction set, with results of the table lookups and headers from the received packets as parameters to determine table updates and header rewrite operations.

19. The IO device of claim 14, wherein each of the plurality of hardware meters is programmable and is further programmed to track a metric for a group of resources,
wherein each of the resources in the group of resources are weighted using weighted values, and wherein each of the plurality of hardware meters is programmed according to the weighted values.

20. The IO device of claim 14, wherein the plurality of pipelined stages and the plurality of hardware meters are in a smart network interface card (NIC).

* * * * *